Jan. 19, 1965     K. W. HASPEL     3,165,976
TEMPLATE CONTROLLED MACHINE TOOL
Filed Oct. 30, 1961     3 Sheets-Sheet 1

Inventor:
KARL WILHELM HASPEL
by Michael S. Striker
Attorney

Jan. 19, 1965   K. W. HASPEL   3,165,976
TEMPLATE CONTROLLED MACHINE TOOL
Filed Oct. 30, 1961   3 Sheets-Sheet 3

Inventor:
KARL WILHELM HASPEL
by Michael S. Striker
Attorney

United States Patent Office 3,165,976
Patented Jan. 19, 1965

3,165,976
TEMPLATE CONTROLLED MACHINE TOOL
Karl Wilhelm Haspel, Oberkochen, Germany, assignor to
Firma Wilhelm Grupp K.G., Werkzeug und Maschinenfabrik, Oberkochen, Germany
Filed Oct. 30, 1961, Ser. No. 148,342
10 Claims. (Cl. 90—13.2)

The present invention relates to a template controlled machine tool, and more particularly to a template controlled milling machine having two milling tools for simultaneously machining two merging or intersecting faces of a pointed workpiece.

Milling machines are known in which two milling tools simultaneously work on the two faces of a pointed workpiece. However, the milling machines of the prior art are incapable of machining the faces to a point where the two faces intersect or merge, since the milling tools interfere with each other at the pointed end of the workpiece. Since in template controlled milling machines, feeler members move along a template, the same difficulty arises with respect to the feeler means, since the same would interfere at the pointed end of the template, and consequently cannot be placed in a position in which the milling tools would machine the faces of the workpiece in the region of the pointed end of the workpiece.

In the template controlled machines of the prior art having two simultaneously operating tools, the tools are guided away from the pointed end of the workpiece before reaching the same, so that the pointed end of the workpiece has to be machined in a separate operation by another machine.

Another disadvantage of known machine tools of this type is that during the return movement of the machine, the feeler members move again along the template and still abut the same when arriving in the initial position of the machine so that an exchange of the sensing members or of tools, or an adjustment of the same is difficult.

It is one object of the present invention to overcome the disadvantages of the known template controlled machine tools serving the above explained purpose, and to provide a template controlled machine tool capable of machining two faces of a workpiece which merge or intersect at one end of the workpiece.

Another object of the present invention is to provide a template means having guide tracks crossing each other at a crossing point so that sensing members moving on the guide tracks may guide corresponding tools up to, and beyond the pointed end of a workpiece.

Another object of the present invention is to provide a first pointed template whose shape corresponds to the outline of a pointed workpiece, and a second template for guiding the respective feeler members beyond the pointed end of the first template so that the tools move beyond the pointed end of the workpiece.

Another object of the present invention is to provide a template controlled machine tool with a template means having guide tracks crossing each other so that the tools can machine the workpiece up to the pointed end thereof while the feeler means are guided on the guide tracks over the crossing point.

With these objects in view, one embodiment of the present invention includes a first unit comprising template means having guide tracks crossing each other at a crossing point, and holder means for holding a workpiece; a second unit comprising feeler means engaging the guide tracks, and tools operatively connected to the feeler means for movement with the same; and means for moving one of these units relative to the other unit so that the feeler means move along the guide tracks.

When the feeler means pass over the crossing point, the tools pass over the pointed end of the workpiece, and consequently it is not necessary to machine such pointed end in a separate operation.

The "pointed end" of the workpiece is formed by two machined faces, and the term "pointed end" is used in the present specification to include shapes of the workpiece where the machined faces merge at a rounded end of the workpiece.

In the preferred embodiment of the invention, the guide tracks are located in parallel planes, and the feeler members are respectively located in these parallel planes and move in the same while engaging the guide tracks of the template means. The respective controlled tools, however, are located in the same plane to simultaneously machine two faces of the workpiece which are located in the same plane.

The two feeler members which move along the guide tracks are spaced from each other along the guide tracks and the template means, so that they do not arrive simultaneously at the crossing point of the guide tracks, and the controlled tools are correspondingly spaced along the workpiece so that first one tool passes beyond the pointed end of the workpiece, whereupon the other tool arrives at the pointed end of the workpiece and completes the operation.

Since the guide tracks and the feeler members are located in different planes, any interference of the feeler members in the region of the crossing point of the guide tracks is avoided.

In the preferred embodiment of the invention, the workpiece, for example a ski, is clamped to the template, and a pair of arm means is provided on opposite sides of the workpiece, each of the arm means carrying a milling tool and a sensing member guided along a guide track of the template means.

In the preferred embodiment of the invention, the template means include a first template whose outline corresponds to the pointed outline of the workpiece, and a second template having second track portions constituting the continuation of the track portions of the first template and providing the crossing point of the guide tracks. Preferably, the second track portions of the second template cross each other so that the guide tracks have a second crossing point whereby the feeler member, and the tools are retracted after having been advanced to form the pointed end of the workpiece. In this manner, the position of the first template can be adjusted while the sensing members rest on the second template.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
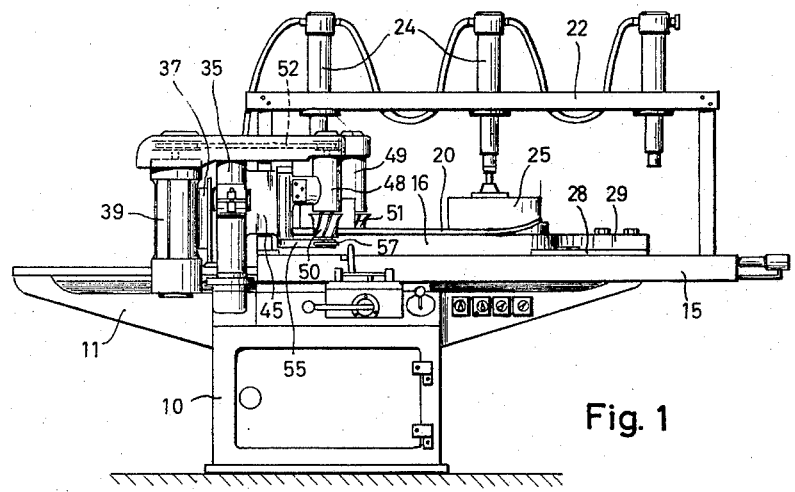
FIG. 1 is a front view of a template controlled milling machine according to one embodiment of the invention.

Referring now to the drawings, a template controlled milling machine has a main support 10 on which a machine bed 11 is fixed. A slide or carriage 15 is mounted for longitudinal movement in guideways of the machine bed 11, and can be moved by conventional means on the machine bed. Template means are secured to the slide 15, and include a first template 16 having guide track portions 17 and 18 which meet at the pointed end of template 16.

A workpiece, shown to be a ski, is secured to the template 16 by holding member 25 which cooperates with another holding member secured to template 16 to fix the pointed and curved end of the workpiece on template 16 and slide 15. A holding bridge 22 is secured to slide 15 and supports pneumatic cylinder-and-piston means 24 which press abutment member 25 down so as to clamp workpiece 20.

A second template is arranged on slide 15 opposite and spaced from the pointed end of template 16, and includes two template members 28 and 29 superimposed on each other and having guide track portions 30 and 31.

Figure 3:
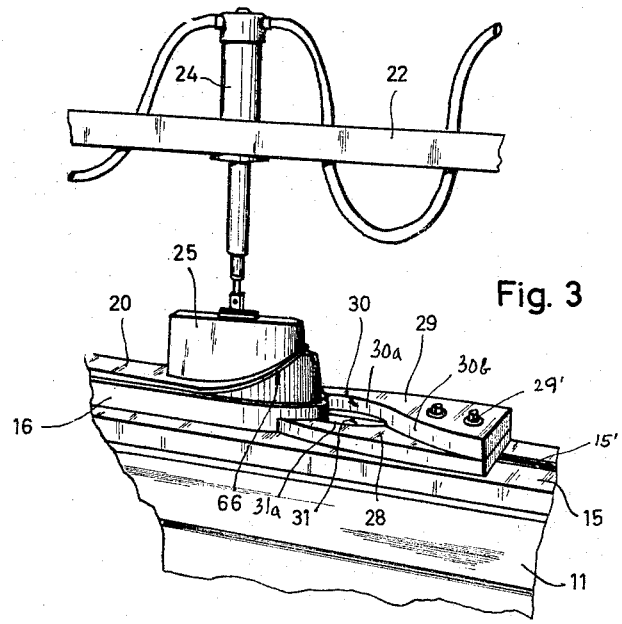
FIG. 3 is a fargmentary perspective view illustrating a detail of the embodiment of FIG. 1.
Figure 4:
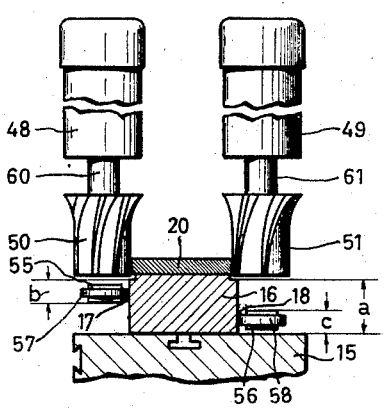
FIG. 4 is a fragmentary sectional view taken on line 4—4 in FIG. 2 and illustrating a detail on an enlarged scale.
Figure 5:
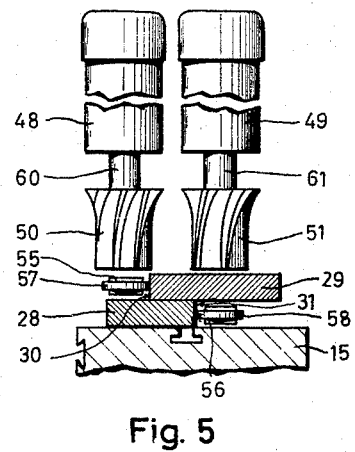
FIG. 5 is a fragmentary sectional view taken on line 5—5 in FIG. 2 and illustrating a detail on an enlarged scale.
Figure 6:
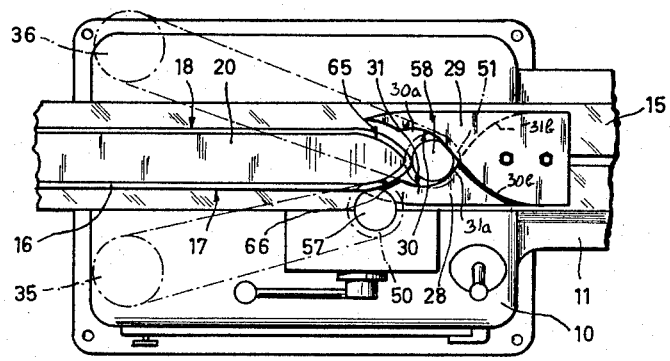
FIG. 6 is a fragmentary plan view illustrating a part of the machine shown in FIG. 2 on an enlarged scale.
Figure 7:
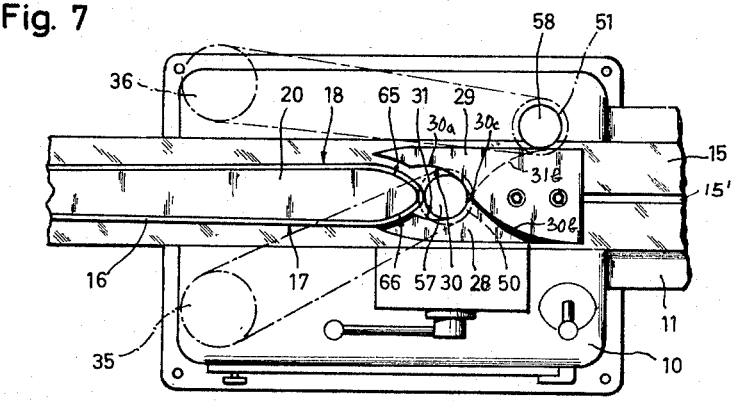
FIG. 7 is a fragmentary plan view corresponding to FIG. 6, but illustrating another operational position of the machine.

As is best seen in FIGS. 3 to 5, the first template 16 has a height $a$ which corresponds to the height of both template members 28 and 29. Guide track portions 30 and 31 have the heights $b$ and $c$, respectively, so that on the first template 16 guide track portions 18 and 17 having the heights $b$ and $c$ are located in the same horizontal planes as guide track portions 30 and 31.

Figure 2:
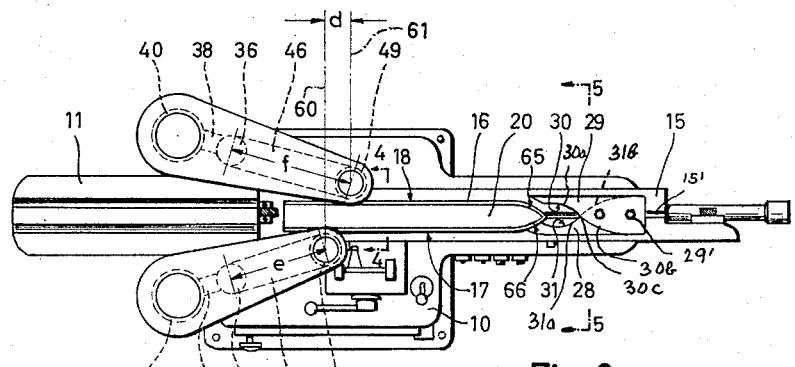
FIG. 2 is a fragmentary plan view of the embodiment of FIG 1.

As best seen in FIG. 2, template member 28 has a portion extending to one side of template 16, while the corresponding portion of template 29 has an end spaced from the respective other side of template 16.

As best seen in FIGS. 2 and 3, template members 28 and 29 have guide track portions which cross each other at the point 30c. The crossing point 30c divides the guide track 30 into two track portions 30a and 30b, and the guide track 31 into two track portions 31a and 31b. Threaded means 29′ secure template members 28 and 29 to each other angularly adjustable, and also to an undercut slot 15′ in slide 15 so that the distance between the crossing point 30c and the pointed end of template 16 can be adjusted.

Fixed columns 35 and 36 are disposed on opposite sides of slide 15, and each column carries arm means which can swing about the vertical axes of columns 35 and 36. The arm means include support arms 37 and 38 carrying motors 39 and 40, respectively, tool arms 45 and 46, and feeler arms 55 and 56 which are fixedly secured to the tool arms 45 and 46 for angular movement with the same. Springs, not shown, bias the arm means to turn inwardly.

The tool arms 45 and 46 carry at their free ends bearings 48 and 49 in which milling tools 50 and 51 are mounted. Tools 50, 51 are cutters with lower cylindrical portions, and upper outwardly flaring portions. Drive motors 39, 40 drive the milling tools 50 and 51 through pulleys and V-belts 52 so that the tools can be rotated while the arm means pivot.

The feeler arms 55, 56 carry feeler rollers 57, 58 which are arranged at different heights, as best seen in FIGS. 4 and 5 so as to be located on guide track portions 17 and 18, respectively, in the initial position shown in FIGS. 1, 2 and 4. Feeler arms 55 and 56 are secured to bolts which are mounted in corresponding bearings of the tool arms 45 and 46 adjustable in vertical direction, so that it is possible to exactly place feeler rollers 57 and 58 on the corresponding guide track portions 17 and 18.

Tool arm 45 and feeler arm 55 have the same length $e$ and are shorter than tool arm 46 and feeler arm 56, which also have the same length $f$. Consequently, the axes of the feeler rollers 57 and 58 are spaced a distance $d$ between ordinates 60, 61 perpendicular to the guide track portions 17 and 18 of template 16.

The machine is operated as follows. A ski 20 is secured to the first template 16 by the holding means 24, 25 in a position in which the opposite lateral faces thereof are parallel to the parallel first guide track portions 17 and 18, and in which the pointed end thereof is substantially aligned with the pointed end of template 16 where guide track portions 17 and 18 cross each other. The slide 15, which forms a unit with a template means 16, 28, 29 and holding means 22, 24, 25, is moved in longitudinal direction of the template means and of workpiece 20 on the machine bed 11, which forms a second unit with columns 39, 40, and with the tool-and-feeler arms. The tools 50 and 51 engage the lateral faces of the workpiece 20 while the feeler rollers 57 and 58 move along the guide track portions 17 and 18. As is clearly shown in FIG. 4, feeler rollers 57, 58 are located at different heights in parallel horizontal planes, while milling tools 50 and 51 are located in the same horizontal plane, although staggered in longitudinal direction of the workpiece the distance $d$, as best seen in FIG. 2.

When the leading feeler roller 58 arrives at the pointed end of template 16, the leading tool 51 arrives at the pointed end of the workpiece 20 after having machined the curved face portion 65 of the workpiece. Feeler roller 58 now passes onto track portion 31a of template member 28 so that the tool 51 passes beyond the pointed end or workpiece 20, and fully machines the curved face portion 65. When feeler member 58 has moved so far on track portion 31 that tool 51 has moved away sufficiently from the pointed end of the workpiece to permit passage of the other tool 50, the trailing tool 50 has passed the curved face portion 66 of workpiece 20, and arrives in the region of the pointed end of the workpiece, while at the same time feeler roller 57 moves on track portion 17 beyond the pointed end of template 16. Feeler roller 57 now passes onto track portion 30a of template member 29 so that tool 50 can pass beyond the pointed end of workpiece 20, and fully machine the same to the pointed end. From the above description of the movements of the feeler members 57 and 58, it will be seen that guide track portions 17 and 18, and guide track portions 30a and 31a together form guide tracks which cross each other so that the feeler members 57 and 58 move along crossing paths, permitting the milling of the faces 65 and 66 of workpiece 20 up to the pointed end of the workpiece. If the end of the workpiece is rounded off, the tool 50 and 51 will move over the line where the faces merge into each other, and fully machine the end portion of the workpiece.

During further movement of slide 15 in the same direction, the leading feeler roller 58 will pass over the second crossing point 30c from track portion 31a to track portion 31b, so that the tool 51 will be retracted. Since the end of track portion 31b is farther spaced from the vertical plane of symmetry of workpiece 20 than the corresponding face of workpiece 20, the tool 51 will not engage the just machined face of the workpiece when the slide 15 is returned to its initial position.

The trailing sensing roller 57 moves from track portion 30a over crossing point 30c to track portion 30b so that tool 50 is retracted, and does not interfere with the machined face of the workpiece 20 when the slide is returned to its initial position. When feeler rollers 57, 58 are on the farthest spaced track portions, the tool arms 45, 46 are in their outermost positions, and may be arrested by releasable catch means, not shown, on columns 35, 36, or manually held by the operator during the return movement of the slide.

Since the feeler rollers 57 and 58 move on guide tracks 17, 30, and 18, 31 at different heights, any interference between the feeler arm 55 and 56 at the two crossing points of the two guide tracks is avoided. Any interference of the tools 50 and 51 in the region of the crossing points is avoided by the longitudinal spacing of the tools along the workpiece.

It will be understood that each of the elements described above, or two or more together, may also find a useful application in other types of template controlled machine tools differing from the types described above.

While the invention has been illustrated and described as embodied in a template means having two guide tracks crossing each other at two crossing points and being located at different levels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a template controlled machine tool, in combination, a first unit comprising elongated template means having at least two guide tracks crossing each other at a crossing point, each guide track having a first track portion on one side of said crossing point and a second track portion on the other side of said crossing point, and holder means for holding a workpiece fixed in a selected position relative to said template means; a second unit comprising at least two feeler means respectively engaging said guide tracks, said feeler means being spaced from each other along said guide tracks, and two tool means operatively connected to said feeler means for movement with the same and adapted to operate on two faces of the workpiece, respectively, said tool means being spaced from each other along said workpiece the same distance as said feeler means are spaced along said template; and means for moving one of said units relative to the other unit so that said feeler means move along said first track portions and successive one at a time over said crossing point to said second track portions and said tool means move along crossing paths whereby said faces are fully machined to a line successively passed by one tool at a time where said faces merge or intersect, while each feeler means moves from the respective first track portion to said second track portion and over said crossing point.

2. In a template controlled machine tool, in combination, a first unit comprising template means having at least two guide tracks located in different planes and crossing each other at a crossing point spaced from each other, each guide track having a first track portion on one side of said crossing point and a second track portion on the other side of said crossing point, and holder means for holding a workpiece fixed in a selected position relative to said template means; a second unit comprising at least two feeler means located in different planes and engaging said guide tracks, and two tool means located in the same plane operatively connected to said feeler means for movement with the same and adapted to operate on two faces of the workpiece, respectively, said tool means being spaced from each other along said workpiece; and means for moving one of said units relative to the other unit so that said feeler means move along said first track portions successively one at a time and over said crossing point to said second track portions and said tool means move along crossing paths whereby said faces are fully machined to a line successively passed by one tool at a time where said faces merge or intersect, while each feeler means moves in a different plane from the respective first track portion to said second track portion and over said crossing point.

3. In a template controlled machine tool, in combination, a first unit comprising template means having two guide tracks crossing each other at a first crossing and at a second crossing point, each guide track having a first track portion on one side of said first crossing point, a second track portion between said first crossing point and said second crossing point, and a third track portion on the other side of said second crossing point, and holder means for holding a workpiece fixed in a selected position relative to said template means; a second unit comprising at least two feeler means respectively engaging said guide tracks at points spaced along said guide tracks, and two tool means operatively connected to said feeler means for movement with the same and adapted to operate on two faces of the workpiece, respectively; and means for moving one of said units relative to the other of said units so that said feeler means move along said first track portions and successively one at a time over said first crossing point to said second track portions and said tool means move along crossing paths whereby said faces are fully machined to a line successively passed by one tool at a time where said faces merge or intersect, and so that said feeler means move from said second track portions over said second crossing point to said third track portions whereby said tool means are moved apart and separated from the workpiece.

4. In a template controlled machine tool, in combination, a first unit comprising elongated template means having two guide tracks crossing each other at a first crossing and at a second crossing point, each guide track having a first track portion on one side of said first crossing point, a second track portion between said first crossing point and said second crossing point, and a third track portion on the other side of said second crossing point, and holder means for holding a workpiece fixed in a selected position relative to said template means, said template means including a first template with a pointed end and having said first track portions on opposite sides thereof and extending to said pointed end, and a second template having said second track portions; a second unit comprising at least two feeler means including feeler members located in different planes and respectively engaging said guide tracks, each of said feeler members having a height less than half the height of said guide tracks, said feeler means being spaced from each other along said guide tracks, and two tool means including two milling cutters located in the same plane operatively connected to said feeler means for movement with the same and adapted to operate on two faces of the workpiece, respectively, said milling cutters being spaced from each other along said workpiece the same distance as said feeler means are spaced along said template, each milling cutter having a cylindrical portion and an outwardly flaring portion; and means for moving one of said units relative to the other unit so that said feeler members move along said first track portions and over said first crossing point to said second track portions and said tool means move along crossing paths whereby said faces are fully machined to a line where said faces merge or intersect, and so that said feeler means move from said second track portions over said second crossing point to said third track portions whereby said tool means are moved apart and separated from the workpiece, said milling cutters passing said line successively and one at a time, and said feeler means moving successively and one at a time over said first and second crossing points.

5. A template controlled machine tool as set forth in claim 4 wherein said second template comprises two parts located in said parallel planes, respectively, and means for securing said two parts to each other, said parts of said second template having said second track portions, respectively; and wherein said second template is adjustable to vary the distance between said second track portions and said pointed end of said first template.

6. A template means having at least two guide tracks crossing each other at a crossing point and being located in parallel planes.

7. A template means including a first template with a pointed end having first track portions on opposite sides thereof located in parallel planes and extending to said pointed end, and a second template having second track portions located in said parallel planes, each of said second track portions being a continuation of the respective first track portion located in the same plane and forming with the same a guide track, said guide tracks crossing each other in the region of said pointed end of said first template at a first crossing point, and further spaced from said pointed end at a second crossing point.

8. A template means as set forth in claim 7 wherein said second track portions of said second template cross each other opposite said pointed end of said first template at said second crossing point.

9. A template means as set forth in claim 8 wherein said second template comprises two parts adjustably secured to each other, said two parts having said second track portions, respectively so that the relative position of said second track portions to each other, and to said first track portions can be adjusted.

10. In a machine tool, in combination, a first unit including holder means for holding an elongated workpiece having longitudinally extending edges forming a point at the end of the workpiece, and template means having two guide tracks including first guide track portions parallel to said edges of said workpiece and second guide track portions extending beyond said edges and said point; a second unit comprising two feeler means respectively engaging said guide tracks, and two tools operatively connected to said feeler means for movement with the same and respectively adapted to machine said edges of the workpiece, said tools and feeler means being staggered in the longitudinal direction of said guide tracks; and means for moving one of said units relative to the other unit so that said feeler means moving along said first guide tracks cause movement of said tools along said edges and moving along said second guide track portions cause successive movements of said tools over and beyond said point of the workpiece, said second unit being constructed and arranged in such a manner that one of said tools reaching the point of the workpiece before the other of said tools crosses over the path of the other of said tools before said other of said tools reaches the point of the workpiece so as to machine one of said edges up to the point thereof and that the other of said tools reaches the point of the workpiece and crosses over the path of said one of said tools after said one of said tools has reached the point of the workpiece so as to machine the other edge of the workpiece up to the point thereof whereby a point of the workpiece having a predetermined angle and sharpness is produced by successive operations of one tool at a time.

References Cited by the Examiner
UNITED STATES PATENTS

| | | | |
|---|---|---|---|
| 1,839,196 | 1/32 | Cameron | 144—144 |
| 2,851,071 | 9/58 | Schils | 144—144 |

WILLIAM W. DYER, JR., *Primary Examiner.*

RICHARD H. EANES, JR., LEON PEAR, *Examiners.*